(12) United States Patent
Jarry

(10) Patent No.: US 10,290,838 B2
(45) Date of Patent: May 14, 2019

(54) METHODS FOR ENCAPSULATING FLEXIBLE THIN-FILM MICRO-BATTERIES TO PROTECT AGAINST ENVIRONMENTAL INTRUSION

(71) Applicant: STMicroelectronics (Tours) SAS, Tours (FR)

(72) Inventor: Vincent Jarry, La Membrolle sur Choisille (FR)

(73) Assignee: STMicroelectronics (Tours) SAS, Tours (FR)

( * ) Notice: Subject to any disclaimer, the term of this patent is extended or adjusted under 35 U.S.C. 154(b) by 105 days.

(21) Appl. No.: 14/847,137

(22) Filed: Sep. 8, 2015

(65) Prior Publication Data

US 2017/0069883 A1 Mar. 9, 2017

(51) Int. Cl.
| | |
|---|---|
| *H01M 2/08* | (2006.01) |
| *H01M 2/24* | (2006.01) |
| *H01M 2/06* | (2006.01) |
| *H01M 2/02* | (2006.01) |
| *H01M 2/22* | (2006.01) |
| *H01M 2/30* | (2006.01) |
| *H01M 10/04* | (2006.01) |
| *H01M 6/40* | (2006.01) |

(52) U.S. Cl.
CPC ......... *H01M 2/0207* (2013.01); *H01M 2/026* (2013.01); *H01M 2/0277* (2013.01); *H01M 2/0285* (2013.01); *H01M 2/0287* (2013.01); *H01M 2/22* (2013.01); *H01M 2/30* (2013.01); *H01M 6/40* (2013.01); *H01M 10/0436* (2013.01); *H01M 10/0463* (2013.01); *H01M 2220/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,632,563 B1* | 10/2003 | Krasnov | ............... | H01M 4/04 429/127 |
| 2002/0001747 A1* | 1/2002 | Jenson | ............... | A61N 1/3787 429/162 |

(Continued)

OTHER PUBLICATIONS

First Office Action and Search Report for co-pending CN Appl. No. 201610113363.5 dated Aug. 28, 2018 (9 pages) No English Translation Available.

*Primary Examiner* — Imran Akram
(74) *Attorney, Agent, or Firm* — Crowe & Dunlevy

(57) ABSTRACT

A battery encapsulation method includes disposing an active battery layer on each of a plurality of battery substrates, with each battery substrate having a greater area than its corresponding active battery layer. The plurality of battery substrates are attached to an interposer having a greater area than an aggregate area of the plurality of battery substrates. The active battery layers are environmentally sealed by disposing a film over the active battery layers sized such that the film extends beyond the active battery layers to contact the battery substrates and the interposer. The interposer is physically along locations where the film contacts the interposer so as to form a plurality of battery units, with each battery unit including one of the battery substrates with the associated active battery layer disposed thereon and being environmentally sealed by the film.

18 Claims, 6 Drawing Sheets

(56) References Cited

U.S. PATENT DOCUMENTS

| | | | | |
|---|---|---|---|---|
| 2005/0260492 A1* | 11/2005 | Tucholski | ............... | H01M 2/08 |
| | | | | 429/185 |
| 2007/0139001 A1* | 6/2007 | Hahn | ................. | H01M 2/0277 |
| | | | | 320/112 |
| 2008/0032236 A1* | 2/2008 | Wallace | ................. | H01M 6/40 |
| | | | | 430/319 |
| 2009/0057136 A1* | 3/2009 | Wang | ..................... | C23C 14/08 |
| | | | | 204/192.15 |
| 2011/0094094 A1* | 4/2011 | Li | ..................... | H01M 10/0436 |
| | | | | 29/623.5 |
| 2011/0300413 A1* | 12/2011 | Jacobs | ................. | A61N 1/3787 |
| | | | | 429/7 |
| 2013/0164607 A1* | 6/2013 | Shih | ................. | H01M 10/0436 |
| | | | | 429/179 |
| 2013/0260183 A1* | 10/2013 | Ellis-Monaghan | ..... | H01M 2/22 |
| | | | | 429/7 |
| 2013/0260230 A1* | 10/2013 | Liang | ................. | H01M 4/0404 |
| | | | | 429/211 |
| 2014/0079984 A1* | 3/2014 | Kajitani | ................. | H01M 2/08 |
| | | | | 429/162 |
| 2015/0125731 A1* | 5/2015 | Ro | ........................ | H01M 2/204 |
| | | | | 429/127 |
| 2016/0049624 A1* | 2/2016 | Bhardwaj | ............... | H01M 2/08 |
| | | | | 429/162 |
| 2016/0301037 A1* | 10/2016 | Durand | ............... | H01M 2/0202 |
| 2016/0343552 A1* | 11/2016 | Sun | ................... | H01M 10/0436 |

* cited by examiner

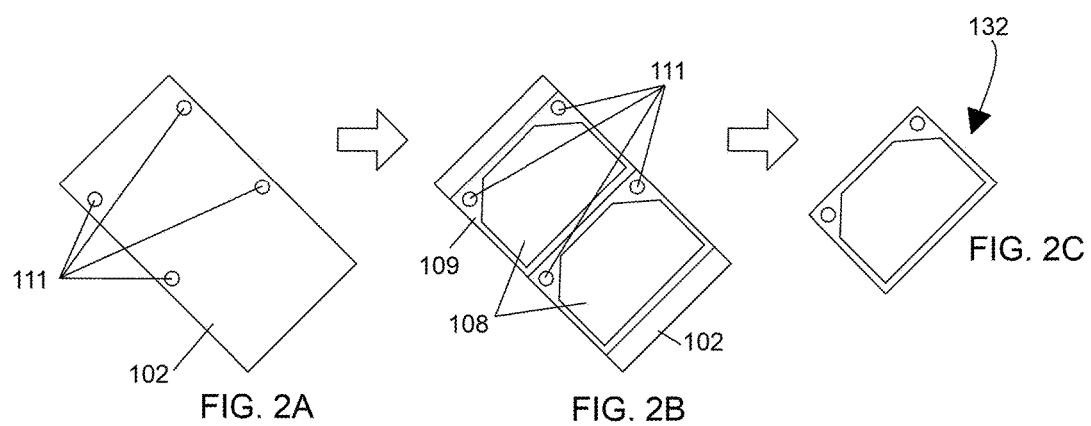
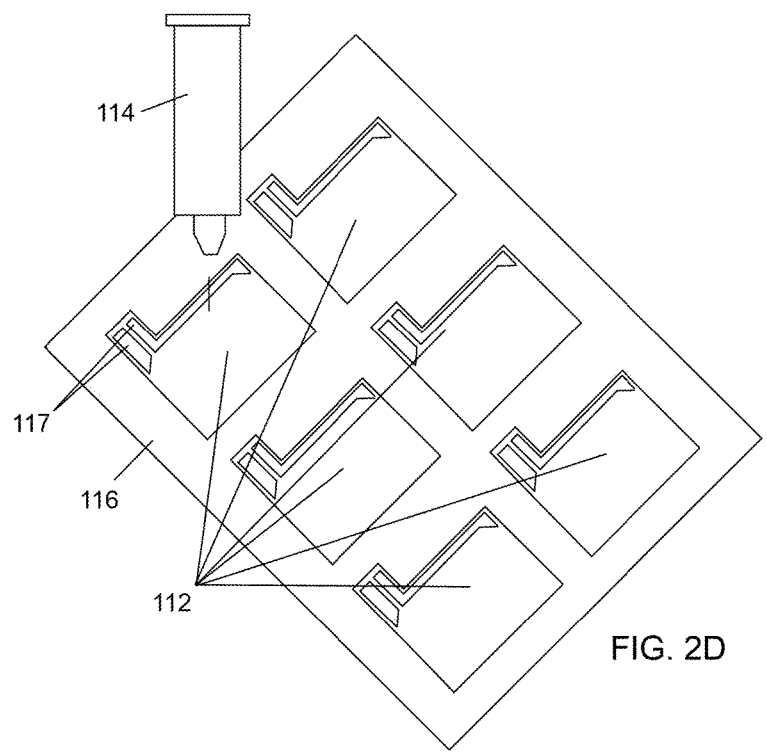

METHODS FOR ENCAPSULATING FLEXIBLE THIN-FILM MICRO-BATTERIES TO PROTECT AGAINST ENVIRONMENTAL INTRUSION

TECHNICAL FIELD

This disclosure relates to the field of battery technology, and more particularly, to methods for encapsulating flexible thin-film micro-batteries to protect against environmental intrusion.

BACKGROUND

Portable electronic devices such as laptops, smartphones, tablets, and cameras are popular with consumers. These electronic devices are powered by batteries, or power units. Due to the portable nature of these electronic devices, they are repeated exposed to environmental contaminants more often than electronic devices such as televisions, for example. This repeated exposure of the electronic device to environmental contaminants brings about a commercial desire for the various internal components, such as the power units, to be protected against such contaminants. Some such power units are flexible thin-film micro-batteries for example.

Such flexible thin-film micro-batteries include, in a stacked arrangement, a mica substrate, an active battery layer on the mica substrate, a polyvinylidene chloride (PVDC) layer coating over the active battery layer, and a mica cover over the PVDC layer. While the PVDC and mica cover provide a degree of protection from environmental contaminants, oxygen and water may over time slowly be able to diffuse through the layers of the stacked arrangement and degrade the active battery layer.

Given that degradation of the active battery layer is commercially undesirable, new designs for power units that are more resistant to environmental contaminants, as well as the processes used to produce such power units, are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method in accordance with this disclosure includes disposing an active battery layer on each of a plurality of battery substrates, with each battery substrate having a greater area than its corresponding active battery layer. The plurality of battery substrates are attached to an interposer having a greater area than an aggregate area of the plurality of battery substrates. This attachment may be performed via the use of non-conductive glue. The active battery layers are environmentally sealed by disposing a film over the active battery layers sized such that the film extends beyond the active battery layers to contact the battery substrates and the interposer. The interposer is physically along locations where the film contacts the interposer so as to form a plurality of battery units, with each battery unit including one of the battery substrates with the associated active battery layer disposed thereon and being environmentally sealed by the film.

Each of the plurality of battery substrates may have battery pads thereon, and each of the plurality of battery substrates may have conductive vias formed thereon through the battery pads for that battery substrate. The interposer may have conductive pads formed on a side thereof on which the plurality of battery substrates is attached positioned such that the conductive pads are electrically coupled to the conductive vias when the plurality of battery substrates is attached to the interposer. Attaching the plurality of battery substrate to the interposer may include depositing conductive glue on adjacent locations of the interposer where the conductive pads are adjacent to the conductive vias.

The film may be disposed over the active battery layers by aligning holes in the film with the conductive pads and laminating the film over the active battery layers. The holes in the film may be aligned with the conductive pads using at least one camera. The holes in the film may be aligned with the conductive pads using a pair of cameras disposed at holes adjacent opposite corners of the film.

The plurality of battery substrates may be attached to the interposer by depositing glue on the interposer adjacent the battery substrate receiving portions, and respectively disposing the plurality of battery substrates on the battery substrate receiving portions. The battery substrate may be mica. The film may include, in a stacked arrangement, an adhesive layer, and aluminum film layer, and a PET layer. In addition, the plurality of battery substrates may be attached to the interposer by disposing the plurality of battery substrates on the interposer without first flipping the plurality of battery substrates over.

Another aspect is directed to an electronic device including an interposer. A mica substrate is disposed on the interposer and has an area smaller than an area of the interposer. An active battery layer is disposed on the mica substrate and has an area smaller than an area of the mica substrate. A film seals the active battery layer and mica substrate, and is sized such that the film extends beyond the active battery layer to contact the mica substrate and the interposer.

A battery pad may be on the mica substrate adjacent the active battery layer. The mica substrate may have a conductive via formed therein through the battery pad. A conductive pad may be formed on the interposer and electrically coupled to the conductive via. The film may have a hole defined therein exposing the conductive pad.

The mica substrate may be rectangular in shape. The active battery layer may be polygonally shaped such that a triangular area is defined on a corner of the mica substrate by an absence of the active battery layer. The battery pad may be within the triangular area. Although triangular areas formed from the absence of the active battery layer have been described, it should be appreciated that the active battery layer may take any suitable shape and thus the areas formed from the absence of the active battery layer may also be any shape, such as a curved shape or rectangular shape.

The film may environmentally seal the active battery layer from oxygen and water ingress. In addition, the film may include, in a stacked arrangement, an adhesive layer, and aluminum film layer, and a PET layer.

A further aspect is directed to an electronic device including an interposer. A plurality of mica substrates may be disposed on the interposer, with each mica substrate having an area smaller than an area of the interposer. An active battery layer may be disposed on each mica substrate and may have an area smaller than an area of that mica substrate. The interposer may have a set of conductive pads for each mica substrate formed thereon. A film may seal the active battery layers and mica substrates, and may be sized such that the film extends beyond each active battery layer to contact each mica substrate and the interposer. The film may have a hole defined therein exposing the set of conductive pads for each mica substrate.

BRIEF DESCRIPTION OF THE DRAWINGS

FIGS. 2A-2I are perspective views showing the process of manufacturing the electronic device of FIG. 1.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
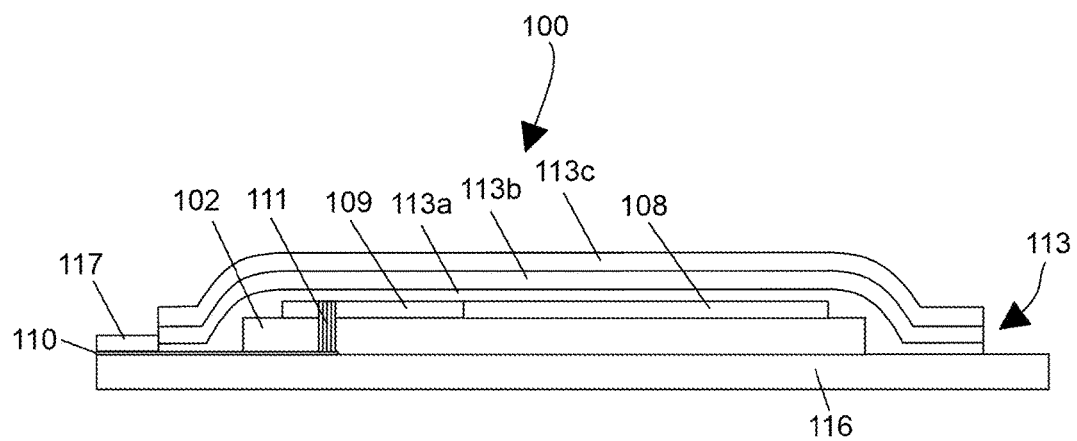
FIG. 1 is a schematic cross sectional diagram of an electronic device in accordance with this disclosure.

With reference to FIG. 1, a power unit 100 is now described. The power unit 100 is for powering a portable electronic device such as a laptop, smartphone, tablet, smartwatch, or camera. Structure of the power unit 100 will now be described.

The power unit 100 includes an interposer 116. A mica substrate 102 is disposed on the interposer 116, and the mica substrate 102 has an area smaller than that of the interposer. A conductive via 111 is formed in the mica substrate 102, and is electrically coupled to a contact pad 117 via conductive glue 110. An active battery layer 108 is disposed on the mica substrate 102 and has an area smaller than that of the mica substrate 102. A battery contact pad 109 for the active battery layer 108 is disposed on the mica substrate 102 adjacent the active battery layer 108 and is electrically coupled to the conductive via 111 via conductive glue.

A film 113 covers the active battery layer 108 and battery contact pad 109, spills over onto the mica substrate 102, and spills over onto the interposer 116. The film is comprised of a layer of glue 113a on the active battery layer 108 and battery contact pad 109, an aluminum film 113b on the layer of glue 113a, and an insulating polyethylene terephthalate (PET) layer 113c on the aluminum film 113b. The film 113 serves to environmentally seal against oxygen and moisture intrusion. The spilling of the film 113 over onto the mica substrate 102 and interposer 116 serves to increase the environmental sealing over prior designs that leave the sides of the components exposed.

Figure 2E:
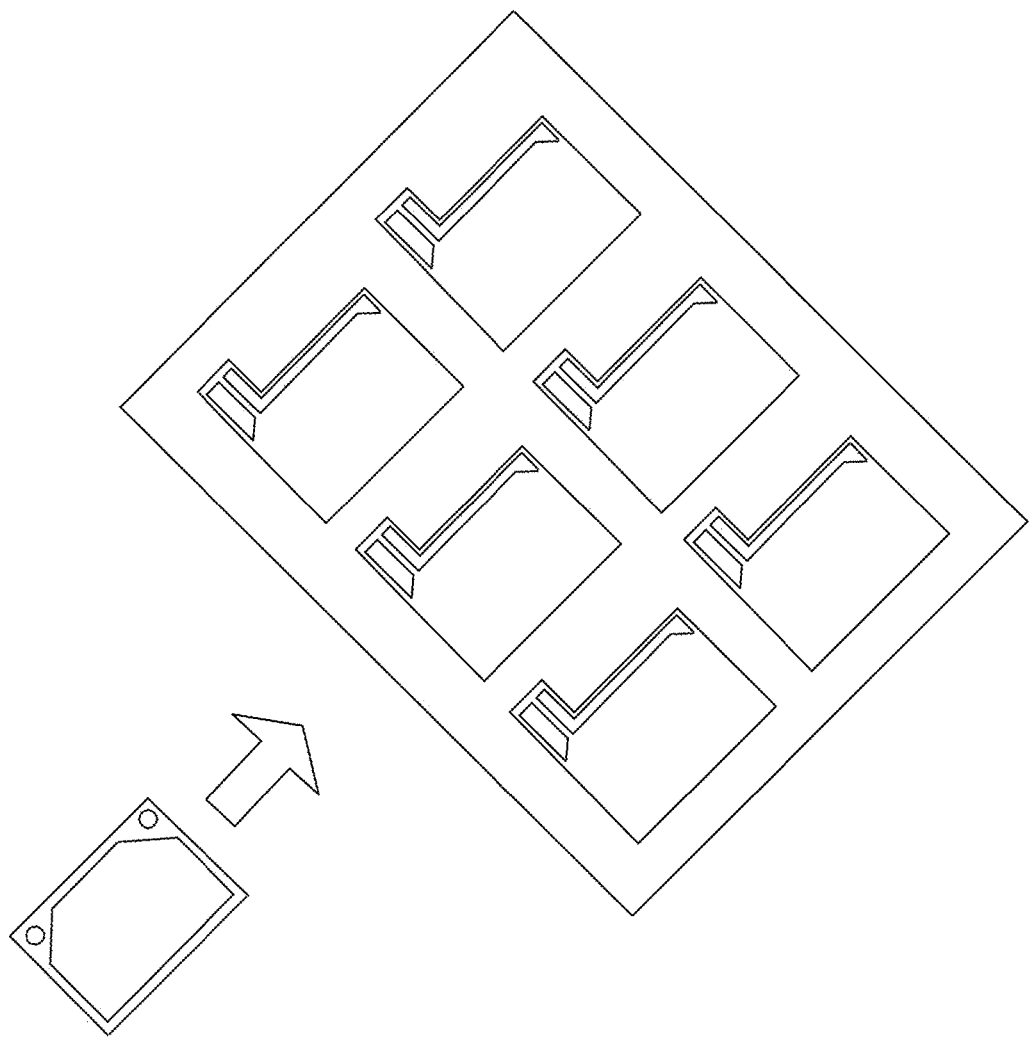

Manufacture of the power unit 100 is now described with reference to FIGS. 2A-2I. Shown in FIG. 2A is the mica substrate 102, with conductive vias 111 formed therein. First, the active battery layers 108 are attached to the mica substrate 102, and the battery contacts 109 are electrically coupled to the conductive vias 111 via conductive glue, as shown in FIG. 2B. Although the mica substrate 102 as shown is sized to receive two active battery layers 108, any size mica substrate 102 that can receive any number of active battery layers 108 may be used. The mica substrate 102 is then cut or separated into separate battery units 100, with each battery unit 100 having an active battery layer 108 thereon, as shown in FIG. 2C.

Each mica substrate 102 is rectangular in shape, but each active battery layer 108 is polygonally shaped such that a triangular area is defined on opposing corners of the mica substrates 102. The conductive vias 111 are positioned within the triangular areas, as are the battery pads 109.

The interposer 116 has a plurality of battery substrate receiving portions 112 formed therein, with a set of contacts 117 formed for each battery substrate receiving portion 112, as shown in FIG. 2D. Adhesive is applied by an adhesive dispenser 114 to each battery substrate receiving portion 112, as also shown in FIG. 2D. Thereafter, each battery unit 100 is placed into a respective battery substrate receiving portion 112, as shown in FIG. 2E. It should be noted that during the placing of each battery unit 100 into its respective battery substrate receiving portion 112, each battery unit 100 is not flipped over. That is, during the attachment of the active battery layers 108 on the top side of the mica substrates 102, the bottom side of the mica substrate 102 remains pointing toward the ground.

Figure 2F:
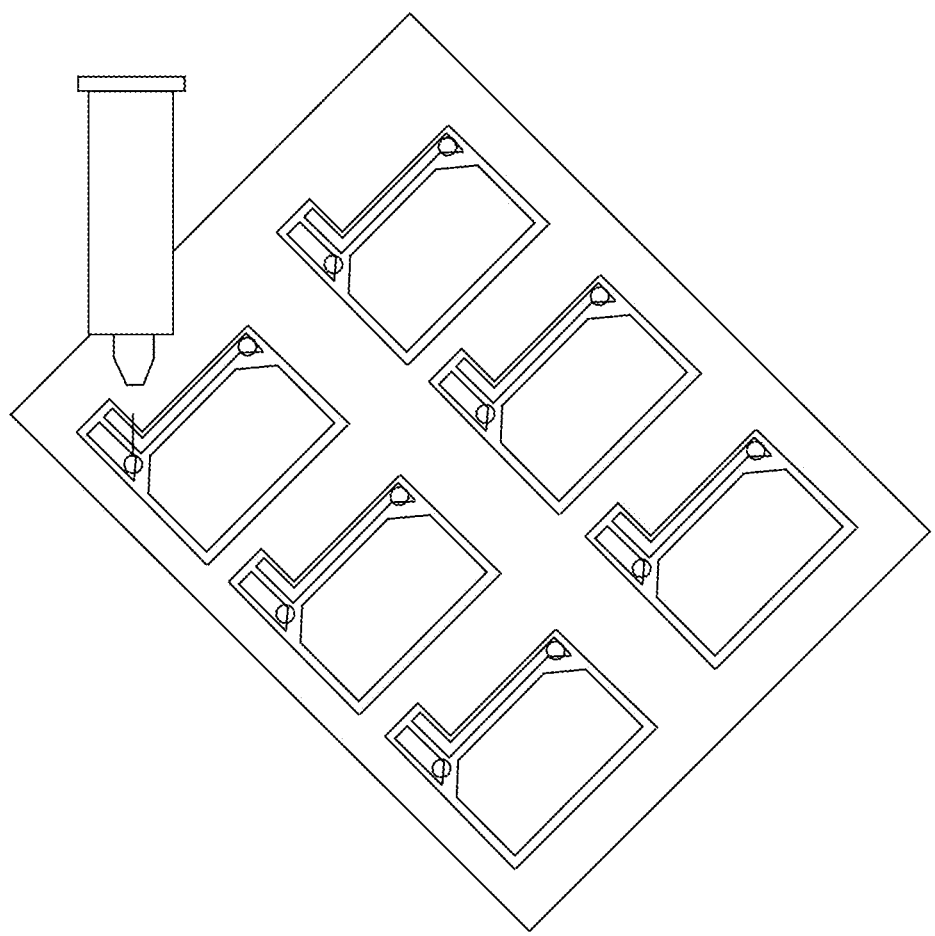
Figure 2G:
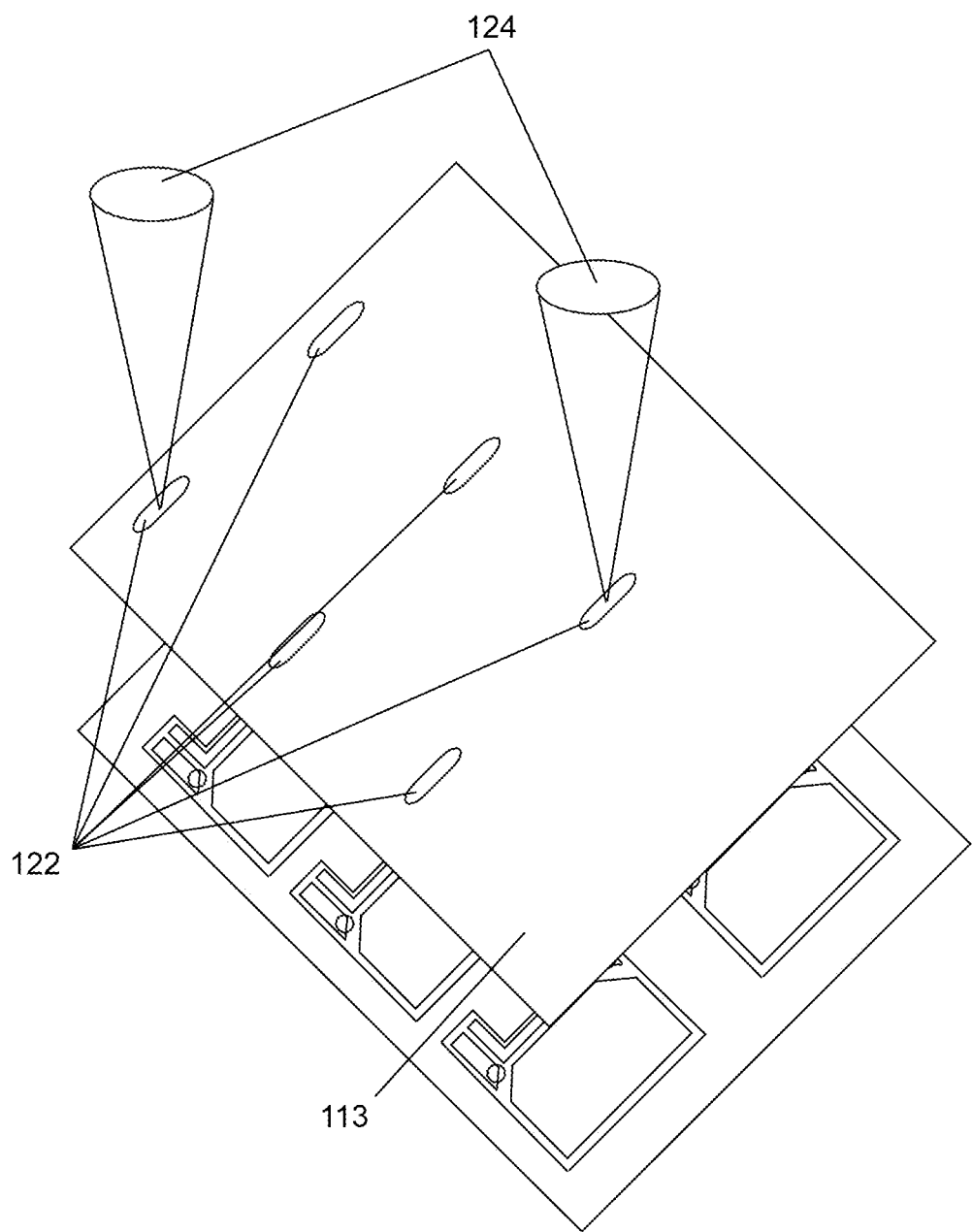
Figure 2H:
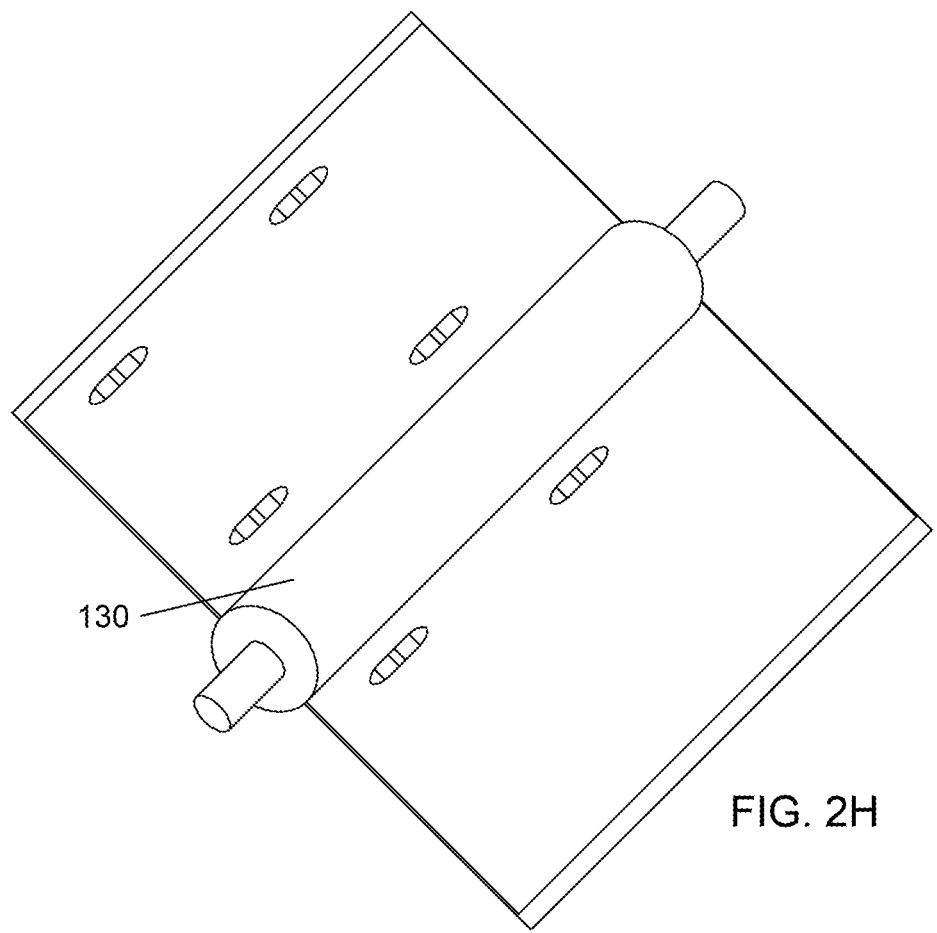
Figure 2I:
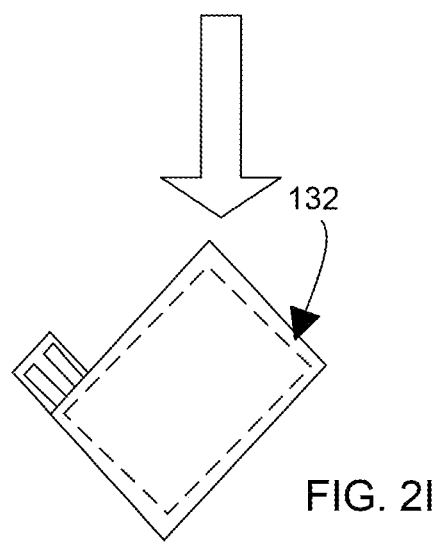

Conductive glue 110 is then applied into the conductive vias 111 so as to electrically couple the battery pads 109 to the conductive pads 117, as shown in FIG. 2F. Then, a film 113 is aligned over the interposer 116. The film 113 has holes 122 formed therein that align with the conductive pads 117. Cameras 124 positioned at opposite corners of the film 113 peer through the holes 122 so that the position of the film 113 with respect to the interposer 116 can be fine tuned, as shown in FIG. 2G. The film 113 is thus aligned and held 1-2 mm above the interposer 116, and a roller 130 is used to laminate the film 113 to the interposer 116, with the conductive pads 110 being positioned within the holes 122. The interposer 116 is then separated via laser singulation into multiple power units 132, with each power unit including an active battery layer 108 thereon.

The process described above for making the battery units 100 eliminates the risk of the aluminum film 113b shorting the pads 117 to the vias 111 or active layer 108 because the aluminum film 113b is insulated from the battery pads 109 by the glue 113a.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method, comprising:
disposing an active battery layer on each of a plurality of battery substrates, each battery substrate having a greater area than its corresponding active battery layer;
attaching the plurality of battery substrates to an interposer substrate having a greater area than an aggregate area of the plurality of battery substrates, wherein the plurality of battery substrates are constructed from mica;
environmentally sealing the active battery layers by disposing a film over the active battery layers sized such that the film extends beyond the active battery layers to contact the battery substrates and the interposer substrate; and physically separating the interposer substrate along locations where the film contacts the interposer substrate so as to form a plurality of battery units, with each battery unit including an interposer substrate portion, one of the battery substrates disposed on the interposer substrate portion, and with an associated active battery layer disposed on that battery substrate, each battery unit being environmentally sealed by the film.

2. The method of claim 1, wherein each of the plurality of battery substrates has battery pads thereon; wherein each of the plurality of battery substrates has conductive vias formed thereon through the battery pads for that battery substrate; wherein the interposer substrate has conductive pads formed on a side thereof on which the plurality of battery substrates is attached positioned such that the conductive pads are electrically coupled to the conductive vias when the plurality of battery substrates is attached to the interposer substrate; and wherein attaching the plurality of battery substrates to the interposer, substrate comprises depositing conductive glue on adjacent locations of the interposer substrate where the conductive pads are adjacent to the conductive vias.

3. The method of claim 2, wherein the film is disposed over the active battery layers by aligning holes in the film with the conductive pads and laminating the film over the active battery layers.

4. The method of claim 3, wherein the holes in the film are aligned with the conductive pads using at least one camera.

5. The method of claim 3, wherein the holes in the film are aligned with the conductive pads using a pair of cameras disposed at holes adjacent opposite corners of the film.

6. The method of claim 1, wherein attaching the plurality of battery substrates to the interposer substrate comprises depositing glue on the interposer substrate adjacent battery substrate receiving portions, and respectively disposing the plurality of battery substrates on the battery substrate receiving portions.

7. The method of claim 1, wherein the film comprises, in a stacked arrangement, an adhesive layer, and aluminum film layer, and a PET layer.

8. The method of claim 1, wherein the plurality of battery substrates are attached to the interposer substrate by disposing the plurality of battery substrates on the interposer substrate without first flipping the plurality of battery substrates over.

9. The method of claim 1, wherein the physical separation of the interposer substrate along locations where the film contacts the interposer substrate forms a plurality of battery units spaced apart from one another.

10. The method of claim 9, wherein the plurality of battery units are spaced apart from one another, do not touch each other, and share no components.

11. The method of claim 1, wherein the film of each battery unit has an area greater than that of its associated active battery layer.

12. The method of claim 11, wherein the area of the film of each battery unit is equal to that of its associated interposer substrate.

13. The method of claim 1, wherein the area of the active battery layer of each battery unit is less than the area of its associated interposer substrate.

14. A method of constructing a plurality of battery units, the method comprising:

attaching each of a plurality of battery portions to a same single interposer substrate, with each battery portion including a battery layer having a first area and a mica substrate carrying the battery layer and having a second area greater than the first area, such that the mica substrate of each battery portion is attached to the same single interposer substrate;

placing a film over, and attached to, the single interposer substrate such that the film contacts the single interposer substrate, each mica substrate, and each battery layer; and physically separating the single interposer substrate along locations where the film contacts the single interposer substrate so as to form the plurality of battery units, with each battery unit including a portion of the single interposer substrate and one of the battery portions disposed on the portion of the single interposer substrate.

15. The method of claim 14, wherein attaching each of the plurality of battery portions to the same single interposer substrate comprises depositing glue on the single interposer substrate adjacent mica substrate receiving portions, and respectively disposing the plurality of battery portions on the mica substrate receiving portions such that a bottom side of each mica substrate is glued to a same side of the single interposer substrate.

16. The method of claim 14, wherein each of the mica substrates has battery pads thereon; wherein each of the mica substrates has conductive vias formed thereon through its battery pads; wherein the single interposer substrate has conductive pads formed on a side thereof on which the plurality of battery portions are attached and positioned such that the conductive pads are electrically coupled to the conductive vias when the plurality of battery portions are attached to the single interposer substrate.

17. The method of claim 16, wherein attaching the plurality of battery portions to the single interposer substrate comprises depositing conductive glue on adjacent locations of the single interposer substrate where the conductive pads are adjacent to the conductive vias.

18. The method of claim 16, wherein the film is placed by aligning holes in the film with the conductive pads and laminating the film.

\* \* \* \* \*